3,332,859
PROCESS FOR PRODUCING TANTALUM FOIL FOR CAPACITORS
Cecil G. Dunn, Scotia, and David A. Vermilyea, Schenectady, N.Y., assignors to General Electric Company, a corporation of New York
No Drawing. Filed Dec. 27, 1963, Ser. No. 334,047
1 Claim. (Cl. 204—32)

This invention relates to tantalum foils for use in electrolytic capacitors and more particularly to a process for producing foils having improved oxide dielectric films.

Modern electrolytic capacitors are commonly made by simultaneously winding a plurality of elongated strips of metal foil, at least one of which has an oxide covered surface, and correspondingly dimensioned and shaped strips of gauze into a cylindrically shaped coil, the gauze acting as a separator between adjacent layers of the foil. In these capacitors, the oxide film acts as a dielectric while the gauze is saturated or impregnated with a suitable electrolyte. The composite coil is enclosed within a suitably closed receptacle which acts to prevent drying of the electrolyte.

It is a principal object of this invention to provide a process for treating tantalum foil which process enables improved oxide dielectric films to be obtained.

Other objects and advantages of this invention will be in part obvious and in part explained by reference to the accompanying specification.

The failures caused by oxide film breakdown have been particularly troublesome in the manufacture of tantalum foil capacitors. Units manufactured in seemingly identical fashion and of apparently identical materials, for some inexplicable reason, may vary measurably in performance characteristics. It has now been found that flaws in oxide films formed anodically on tantalum surfaces are thin spots in the film. Apparently, if the surface of the tantalum contains some region on which film formation is strongly hindered for some reason, then this region can be surrounded by growth of the film parallel to the surface. The film thickness in the region of the flaw is diminished because the electric field during anodization must pull tantalum ions from outside the region of the flaw into its center. Thus, an annular depression is created on the metal surface surrounding the flaw as a result of the added metal consumption in that region. In all likelihood there is a gap between the metal and the oxide film under the region of thin oxide film surrounding a flaw site.

Tantalum thin foils, and by thin foils we mean those that range from less than 1 mil in thickness up to about 10 mils in thickness, are normally produced by cold rolling a starting ingot or body down to some desired final thickness, etching to increase the surface area available for subsequent anodizing and thereafter effecting such an anodization to develop the oxide dielectric film. We have now found that an imperfect amorphous tantalum oxide film is formed on the surface of the foil during the cold rolling effected to reduce the starting body to final gauge. An amorphous film which is uneven, loose, and imperfect, may also be created by etching treatments frequently given the rolled foil to increase its surface area. Excellent evidence has now been obtained which bolsters our belief that the imperfect amorphous film resulting from either rolling or etching results in final dielectric films which contain large numbers of flaws.

Considering the present invention in more detail, tantalum starting bodies were cold rolled in several reduction stages to final thicknesses of up to 10 mils, both zone refined and arc melted tantalum being used in the work. Samples of the material in the as-rolled condition were anodically etched in a solution consisting of, by weight percent, 94.8 percent absolute refined methanol, 3.8 percent ammonium bromide, 0.63 percent lithium chloride and 0.77 percent distilled water. The etching was carried out using an applied current of 70 milliamps per square inch for 10 minute periods. The particular etchant used is not unique to this invention and other etching solutions can be as effectively be used. For example, Patent No. 2,863,811, Ruscetta et al., issued Dec. 9, 1958, describes and claims several other solutions which can be used.

Following this treatment, the anodically etched specimens were anodized at applied voltages up to 195 in a solution of $1/10$ weight percent phosphoric acid. This anodizing treatment is one conventionally used to obtain dielectric oxide films on tantalum. The films resulting from this procedure were studied microscopically and it was found that there were usually on the order of $10^7$–$10^8$ flaws per square centimeter of surface area and that the dielectric breakdown strength is therefore reduced.

Other specimens were produced by providing specimens from cold rolled tantalum foil both before and after the etching treatment outlined above and subjecting them to a chemical treatment which removed the imperfect amorphous tantalum oxide that was present on the surfaces of all specimens. Specifically, it has been found that amorphous tantalum oxide can be removed by immersing the foil in heated alkali metal hydroxide solutions (NaOH, KOH, LiOH) whose pH is 14 or greater, in heated 95.5 percent sulfuric acid solution and in a 48 percent hydrofluoric solution. Use of the alkali solutions and the sulfuric acid solution are effected hot, whereas the hydrofluoric acid solution can be used at room temperature. Etching time when using hydrofluoric acid generally runs from 1 to 30 seconds, whereas the sulfuric acid and alkali metal hydroxide solutions normally require longer times.

If desired, this cleansing operation can be effected by applying anodic voltages to the foil during immersion, up to 2 volts generally being adequate to accelerate the cleaning action. Samples were cleansed by immersion in hot 95.5 percent $H_2SO_4$, hot NaOH having a pH of about 14.5 and in 48 percent hydrofluoric acid and it was found that these treatments were very efficacious in effecting removal of the amorphous oxide film. The time of immersion ranged from 1 to 30 seconds, times in excess of these resulting in excessive dissolution of metal. These specimens were then subjected to the same anodizing treatment as the previously discussed specimens to develop the oxide dielectric film on the surface, that is, they were anodized at up to 195 volts in a $1/10$ weight percent phosphoric acid solution. A microscopic study of the films on the bodies given the cleansing immersion indicated that the number of flaws per square centimeter had been sharply decreased, being on the order of $10^4$ and $10^5$. The dielectric breakdown strength of the material is therefore measurably improved.

Thus, the present process is one wherein tantalum foils for use in electric capacitors are given a special cleansing treatment to remove imperfect amorphous tantalum oxide films from the surfaces of the foil prior to the time at which foil is given its final anodizing treatment. If this important step is effected, the number of flaw sites is materially reduced so that the resulting dielectric film has lower electric leakage and at the same time increased life expectancy.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claim.

What we claim as new and desire to secure by Letters Patent of the United States is:

In the process for producing tantalum foil for use in electrolytic capacitors from tantalum foil having an imperfect amorphous tantalum oxide film on the surface thereof, the steps comprising cold rolling a body of tantalum to a final foil thickness, anodically etching the rolled foil of final thickness, subsequently immersing the foil in an aqueous cleansing solution selected from the group consisting of 48 weight percent hydrofluoric acid, boiling 95.5 weight percent sulfuric acid and boiling alkali metal hydroxide having a pH of at least 14 for from about 1 to 30 seconds to dissolve the amorphous oxide film and subsequently anodizing said foil.

References Cited

UNITED STATES PATENTS

| 2,775,553 | 12/1956 | Kahan | 204—56 X |
| 2,808,542 | 10/1957 | Vermilyea | 156—18 X |
| 2,863,811 | 12/1958 | Ruscetta et al. | 204—32 X |
| 3,024,095 | 3/1962 | Fincham | 156—20 |
| 3,190,822 | 6/1965 | Burnham | 204—141 |

OTHER REFERENCES

Hopkins, B. Smith, "Chemistry of the Rarer Elements," D. C. Heath and Co., p. 230, 1923.

JOHN H. MACK, *Primary Examiner.*

G. KAPLAN, *Assistant Examiner.*